US012340939B2

(12) United States Patent
Blecic et al.

(10) Patent No.: US 12,340,939 B2
(45) Date of Patent: Jun. 24, 2025

(54) SYMMETRIC AIR-CORE PLANAR TRANSFORMER WITH PARTIAL ELECTROMAGNETIC INTERFERENCE SHIELDING

(71) Applicant: Texas Instruments Incorporated, Dallas, TX (US)

(72) Inventors: Raul Blecic, Freising (DE); Nicola Bertoni, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 384 days.

(21) Appl. No.: 17/515,391

(22) Filed: Oct. 29, 2021

(65) Prior Publication Data

US 2023/0138281 A1 May 4, 2023

(51) Int. Cl.
*H01F 27/36* (2006.01)
*H01F 27/28* (2006.01)

(52) U.S. Cl.
CPC ....... *H01F 27/363* (2020.08); *H01F 27/2885* (2013.01)

(58) Field of Classification Search
CPC .. H01F 27/363; H01F 27/2885; H01F 27/288; H01F 2019/085; H01F 2027/2809; H01F 2027/2819; H01F 27/2804
USPC .................................... 336/84 M, 84 R, 84 C
See application file for complete search history.

(56) References Cited

U.S. PATENT DOCUMENTS 7,084,728 B2 * 8/2006 Hyvonen ............ H01L 23/5227 336/200
8,531,261 B2 * 9/2013 Pache ................. H01F 27/2804 336/84 R
2006/0202776 A1 * 9/2006 Lee ..................... H01F 17/0013 333/25
2007/0247269 A1 * 10/2007 Papananos .......... H01L 23/5227 336/200
2009/0284339 A1 * 11/2009 Choi ................... H01F 17/0013 336/200

FOREIGN PATENT DOCUMENTS

TW I408796 * 9/2013

OTHER PUBLICATIONS

"UCC12050 High-Efficiency, Low-EMI, 5-kV RMS Reinforced Isolation DC-DC Converter", UCC12050, Texas Instruments Incorporated, SNVSB38C, Sep. 2019, Revised Apr. 2020, pp. 1-34.

(Continued)

*Primary Examiner* — Tuyen T Nguyen
(74) *Attorney, Agent, or Firm* — Frank D. Cimino

(57) ABSTRACT

A laminate transformer includes a multilayer substrate having at least first, second, third, and fourth metal layers. The second metal layer and the third metal layer are separated by a voltage barrier having a thickness. A first multiloop coil has at least a first loop on the first metal layer and at least a second loop on the second metal layer. A second multiloop coil has at least a third loop on the third metal layer and at least a fourth loop on the fourth metal layer. A partial EMI shield for the first multiloop coil is on the second metal layer. A partial EMI shield for the second multiloop coil is on the third metal layer.

17 Claims, 11 Drawing Sheets

(56) References Cited

OTHER PUBLICATIONS

Timothy Hegarty, "An overview of conducted EMI specifications for power supplies", Texas Instruments Incorporated, SLYY136, Feb. 2018, pp. 1-7.
Timothy Hegarty, "An overview of radiated EMI specifications for power supplies", Texas Instruments Incorporated, SLYY142, Jun. 2018, pp. 1-12.

* cited by examiner

SYMMETRIC AIR-CORE PLANAR TRANSFORMER WITH PARTIAL ELECTROMAGNETIC INTERFERENCE SHIELDING

TECHNICAL FIELD

This relates to a low-cost symmetric air-core planar transformer with high coupling and low electromagnetic interference (EMI).

BACKGROUND

Moving signals and power across an isolation barrier is a common challenge for designers. Isolation might be required for safety, noise immunity or large potential differences between system domains. For example, a cellphone charger is internally isolated to prevent humans from becoming electrically tied to the mains if the connector short-circuits. In other applications like factory robots, sensitive control circuitry sits on a separate ground and is isolated from the motors that draw large DC currents that create noise and ground bounces. Similarly, in electric drive automotive applications, sensitive control circuitry sits on a separate ground and is isolated from the drive motor(s) that draw large DC currents that create noise and ground bounces

SUMMARY

In described examples, a laminate transformer includes a multilayer substrate having at least first, second, third, and fourth metal layers. The second metal layer and the third metal layer are separated by a voltage barrier having a thickness. A first multiloop coil has at least a first loop on the first metal layer and at least a second loop on the second metal layer. A second multiloop coil has at least a third loop on the third metal layer and at least a fourth loop on the fourth metal layer. A partial EMI shield for the first multiloop coil is on the second metal layer. A partial EMI shield for the second multiloop coil is on the third metal layer.

DETAILED DESCRIPTION

Figure 1:
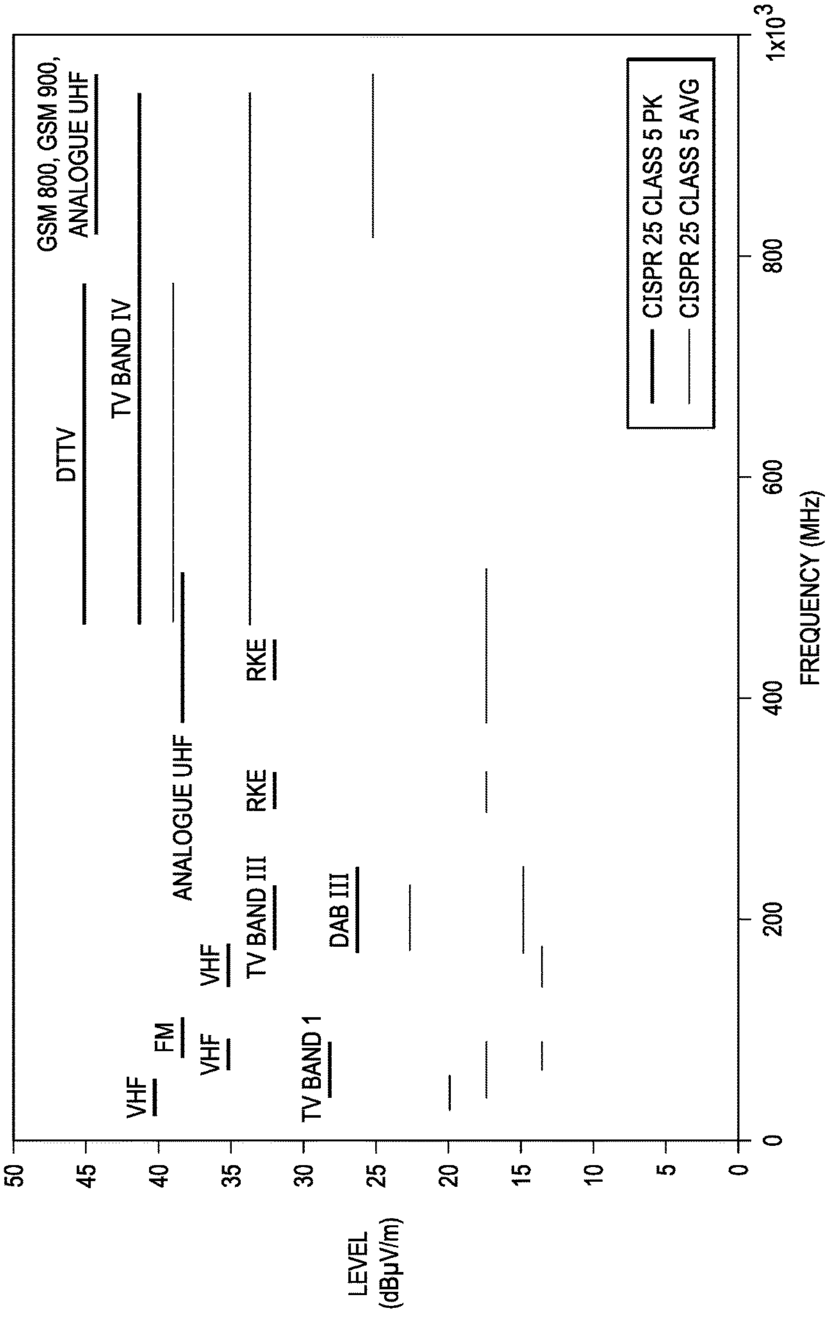
FIG. 1 is a plot illustrating an example EMI interference standard requirement.

In the drawings, like elements are denoted by like reference numerals for consistency.

Galvanic isolation is a principle of isolating functional sections of electrical systems to prevent current flow from one section to another. To prevent current flow, no direct conduction path is permitted. Energy or information can still be exchanged between the sections by other means, such as capacitance, induction, or electromagnetic waves, or by optical, acoustic, or mechanical means.

Galvanic isolation may be used where two or more electric circuits must communicate, but their grounds may be at different potentials. It is an effective method of breaking ground loops by preventing unwanted current from flowing between two units sharing a ground conductor. Galvanic isolation is also used for safety, preventing accidental current from reaching ground through a person's body.

The general operation of laminate transformer galvanic isolation devices is known; see, for example, "UCC12050 High-Efficiency, Low-EMI, 5-kVRMS Reinforced Isolation DC-DC Converter," SNVSB38C, September 2019, revised April 2020, which is incorporated by reference herein.

The term "air-core" refers to the permeability of the core in example transformers. In described examples, transformer coils are fabricated on non-magnetic laminate material that has approximately the same permeability as air. Permeability (μ) is the measure of magnetization that a material obtains in response to an applied magnetic field. The laminate provides mechanical support but does not improve coupling between the transformer coils.

Numerous governing bodies regulate the permissible levels of conducted and radiated emissions generated by an end product in order to maintain electromagnetic compatibility (EMC). See, for example: "An overview of conducted EMI specifications for power supplies," Timothy Hegarty, February 2018, and "An overview of radiated EMI specifications for power supplies, Timothy Hegarty, June 2018 Power converters embedded within products for automotive, communications and industrial application market sectors demand high switching frequencies, advances in circuit topologies and high-speed switching power devices. EMI is an increasingly significant and challenging topic for fast-switching power converters. Moreover, the EMI filter required to achieve regulatory compliance can represent a significant portion of the overall system footprint, volume, and cost.

FIG. 1 is a plot illustrating an example radiated EMI interference standard requirement. From an automotive electronic product designer's perspective, an essential set of conducted and radiated emissions tests are those specified by IEC (International Electrotechnical Commission) CISPR 25 (Comité International Special des Perturbations Radioelectriques), the fourth edition from 2016 being relevant at the time of this writing. This international standard applies to automotive components and modules, with measurements performed using one or two 5μ/50Ω artificial networks (ANs) depending on the grounding configuration. The standard refers to the "protection of onboard receivers," with conducted noise measured over a frequency range from 150 kHz to 108 MHz in specific frequency bands. These frequency ranges are dispersed across the low wave (LW), medium wave (MW) AM broadcast, short wave (SW), citizen band (CB) mobile service band, very high frequency (VHF), television (TV), and FM broadcast. CISPR 25 specifies conducted emission limits for peak (PK), quasi-peak (QP), and average (AVG) signal detectors.

FIG. 1 plots the relevant radiated limit lines for CISPR 25, Class 5, the most stringent requirement from CISPR 25. Even though higher noise spikes are theoretically allowed in the gaps between frequency bands, automotive manufacturers may choose to extend these frequency ranges according to their specific in-house requirements. The limits are quite challenging, particularly the 18 dB μV average (or 38 dB μV peak) limit in the VHF and FM bands spanning 68 MHz to 108 MHz. The filter component's parasitics degrade EMI filter attenuation at such frequencies.

Power-supply products marketed for communications and information technology (IT) end equipment within the EU (European Union) must meet the requirements of EN 55032 (CISPR 32). Equipment intended primarily for use in a residential environment must meet Class B limits, with all other equipment complying with Class A.

Figure 2:
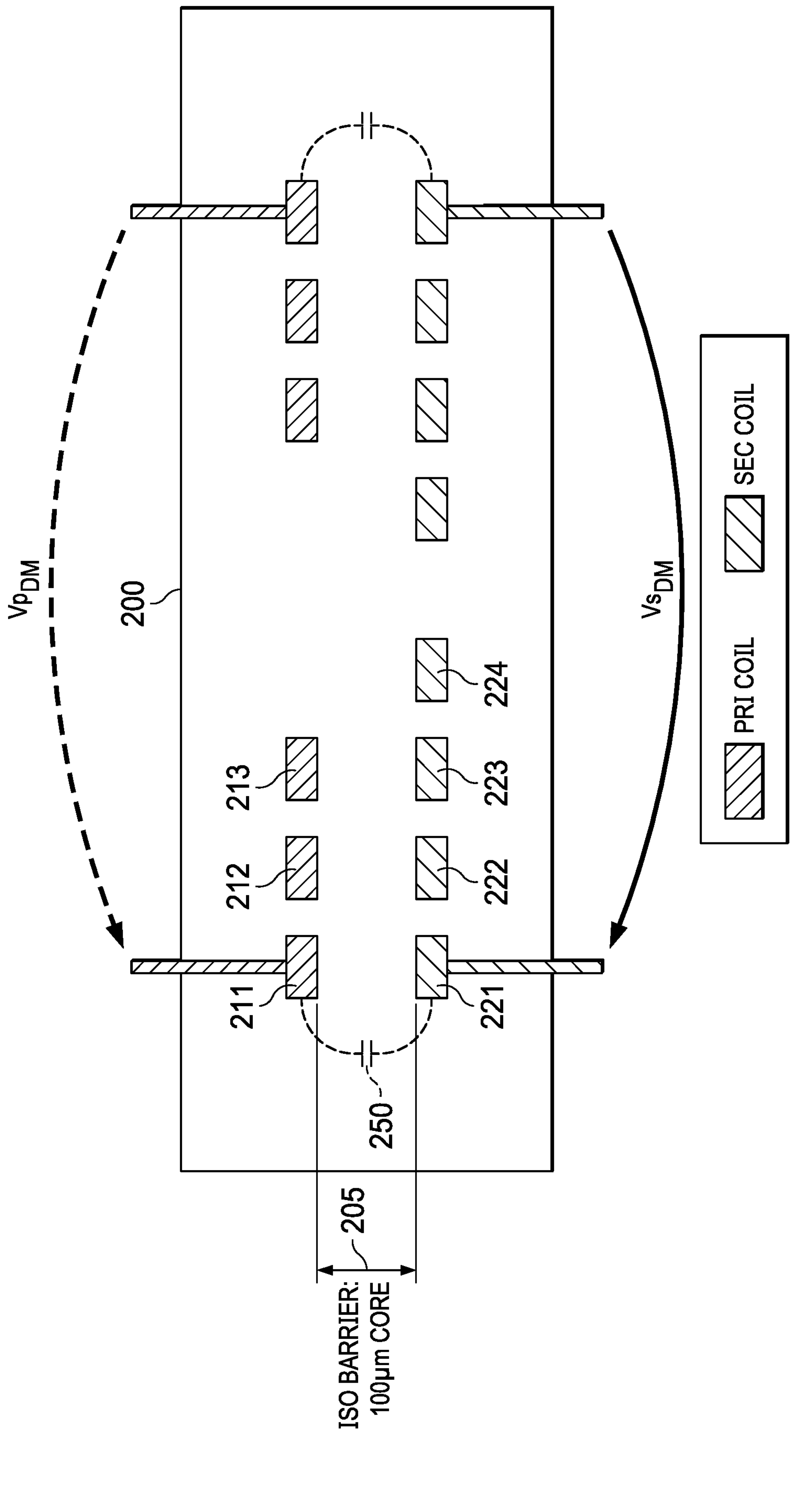
FIG. 2 (PRIOR ART)
FIGS. 2, 3 are cross-sectional views of conventional transformers.

FIG. 2 is a cross-sectional view of a conventional isolation transformer 200 that does not include inter-coil shielding. Transformer 200 is a laminate transformer in which a planar primary coil of three loops 211, 212, 213 and a secondary coil of four loops 221, 222, 223, 224 are spaced apart by a barrier space 205 that is sufficient to provide an insulated barrier to withstand a specified breakdown voltage. In this example, barrier space 205 is approximately 100 μm. A differential mode primary voltage VpDM is applied to the primary coil and a secondary voltage VsDM is produced on the secondary coil. VpDM is a functional voltage that is used for the power transfer across the transformer barrier. Transformer 200 does not meet EMI requirements because of differential-mode injection, which is dominant in the part of the coil closer to the driver circuitry. Transformer 200 does meet efficiency requirements because it has a high coupling coefficient of approximately 80% due to the proximity of the secondary coil to the primary coil. Parasitic capacitance 250 is the parasitic capacitance between coils and is the root cause of EMI in isolated converters. It does not contribute to the power transfer but it injects part of the current across the barrier leading to increased EMI.

Figure 3:
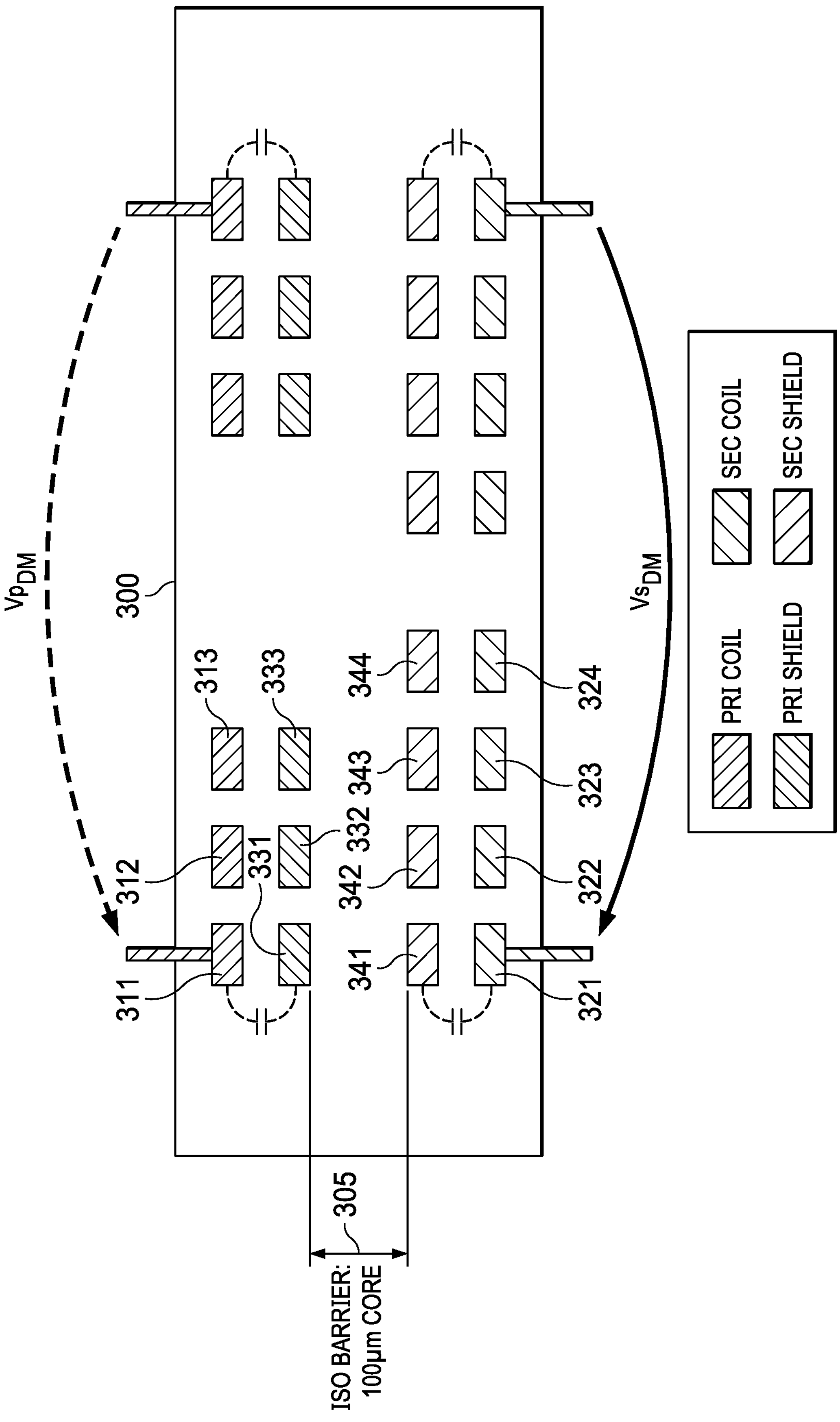
FIG. 3 (PRIOR ART)

FIG. 3 is a cross-sectional view of a conventional isolation transformer 300 that has full inter-coil shielding. Transformer 300 is a laminate transformer in which a planar primary coil of three loops 311, 312, 313 and a secondary coil of four loops 321, 322, 323, 324. In this example, a planar primary shield coil of three loops 331, 332, 333 and a secondary shield coil of four loops 341, 342, 343, 344 are spaced apart by a barrier space 305 that is sufficient to provide an insulated barrier to withstand a specified breakdown voltage. In this example, barrier space 305 is approximately 100 μm. A primary voltage VpDM is applied to the primary coil and a secondary voltage VsDM is produced on the secondary coil.

Transformer 300 does meet EMI requirements because the shield coils reduce differential and common mode EMI. However, transformer 300 does not meet efficiency requirements because the primary and secondary coils are separated further apart by the shield coils and the coupling coefficient is thereby reduced to approximately 62%. Efficiency may be increased by adding magnetic components to increase coupling, but at an increased cost.

Figure 4:
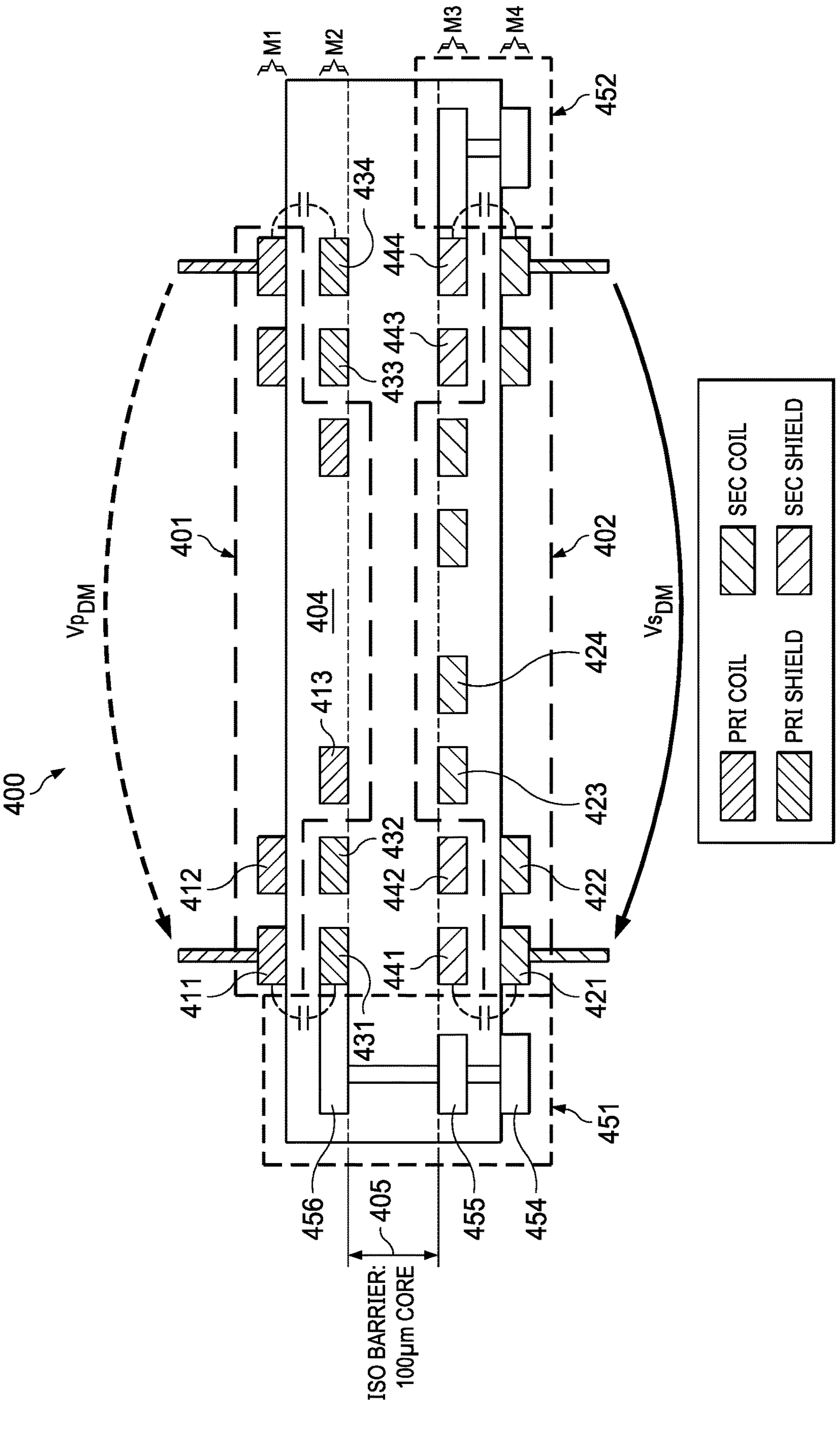
FIG. 4 is a cross-sectional view of an example symmetric air-core transformer that includes partial EMI shielding.

FIG. 4 is a cross-sectional view of an example symmetric air-core transformer 400 that includes partial EMI shielding. In this example, laminate transformer 400 includes a multilayer laminate substrate 404 that has a top surface and an opposite bottom surface. A primary coil 401 having loops 411, 412, 413 and a secondary coil 402 having loops 421, 422, 423, 424 are each located on two or more laminate layers of multilayer laminate substrate 404.

In this example, the laminates are copper clad laminates and pre-pregs. Each pre-preg isolation layer has a thickness in the range of 30-70 um. This allows the copper that forms the coils to be much thicker than the metal used in prior digital isolation devices that are formed on a silicon substrate. This allows larger current flows to be handled for power and signal applications. Transformer performance (quality factor, efficiency) may thereby be controlled by using copper thickness of 12 μm-30 μm and multiple metal layers to allow parallel inductor coils and lower coil resistance. In various examples, two to eight, or more metal layers may be used to form a secondary coil and a primary coil.

In this example, the primary coil 401 is fabricated using two parallel conductive layers M1, M2 within multilayer laminate substrate 404. The secondary coil 402 is fabricated using two parallel conductive layers M3, M4 within multilayer laminate substrate 404. Each conductive layer is patterned and etched to form conductive signal lines that are arranged in a symmetrical loop. Vias are fabricated to connect the separate layers to form a completed coil. A primary voltage VpDM is applied to the primary coil and a secondary voltage VsDM is produced on the secondary coil In this example, a partial primary electromagnetic shield coil of two loops each separated into two portions 431, 432, 433, 434 and a partial secondary electromagnetic shield coil of two loops each separated into two portions 441, 442, 443, 444 are spaced apart by a barrier distance 405 that is sufficient to provide an insulated barrier to withstand a specified breakdown voltage. In this example, barrier distance 405 is approximately 100 μm. Primary shield portions 431, 432, 433, 434 are coupled to a ground reference in the primary voltage domain, while secondary shield loop portions 441, 442, 443, 444 are coupled to a ground reference in the secondary voltage domain.

In this example, primary loops 411, 412 are on metal layer M1, while primary loop 413 and partial primary shield portions 431, 432, 433, 434 are on metal layer M2. Similarly, secondary loops 421, 422 are on metal layer M4, while secondary loops 413, 414 and partial secondary shield portions 441, 442, 443, 444 are on metal layer M3. In this manner, primary loop 413 and secondary loops 423, 424 are positioned as close together as possible while maintaining the ISO barrier distance of 100 μm. In this example, the isolation barrier is rated to provide an isolation voltage protection of 5 kv. In another example, the isolation barrier may be rated at 3 kv due to a smaller barrier thickness or a lower breakdown voltage rating for the laminate material. In other examples, the isolation rating may be higher or lower than this, depending on the design of the isolation transformer.

This configuration meets the CISPR 25 EMI requirement and provides improved coupling of approximately 69% compared to transformer 300 (FIG. 3) at approximately 62%. This configuration also provides a higher Q-factor due to reduced proximity effect which also contributes to improved efficiency. When currents are flowing through two or more nearby conductors the distribution of current is constrained to smaller regions resulting in increased AC resistance In this example, a thermal enhancement feature provides a thermal conductive path 451 with one end coupled to primary shield loop 431 and the other end exposed on the outer surface of multilayer substrate 404. In this example, thermal pads 454, 455, 456 are interconnected by vias. Similarly, a thermal path 452 is provided from secondary partial shield portion 444 to an outer surface of multilayer substrate 404 that includes thermal pads interconnected with vias. The various thermal pads of the thermal enhancements may be complete loop portions that extend the length of the respective shield loop portion. In some examples, the thermal pads may be shortened. Multiple vias can be provided to interconnect the thermal pads to improve thermal conductivity.

Figure 5:
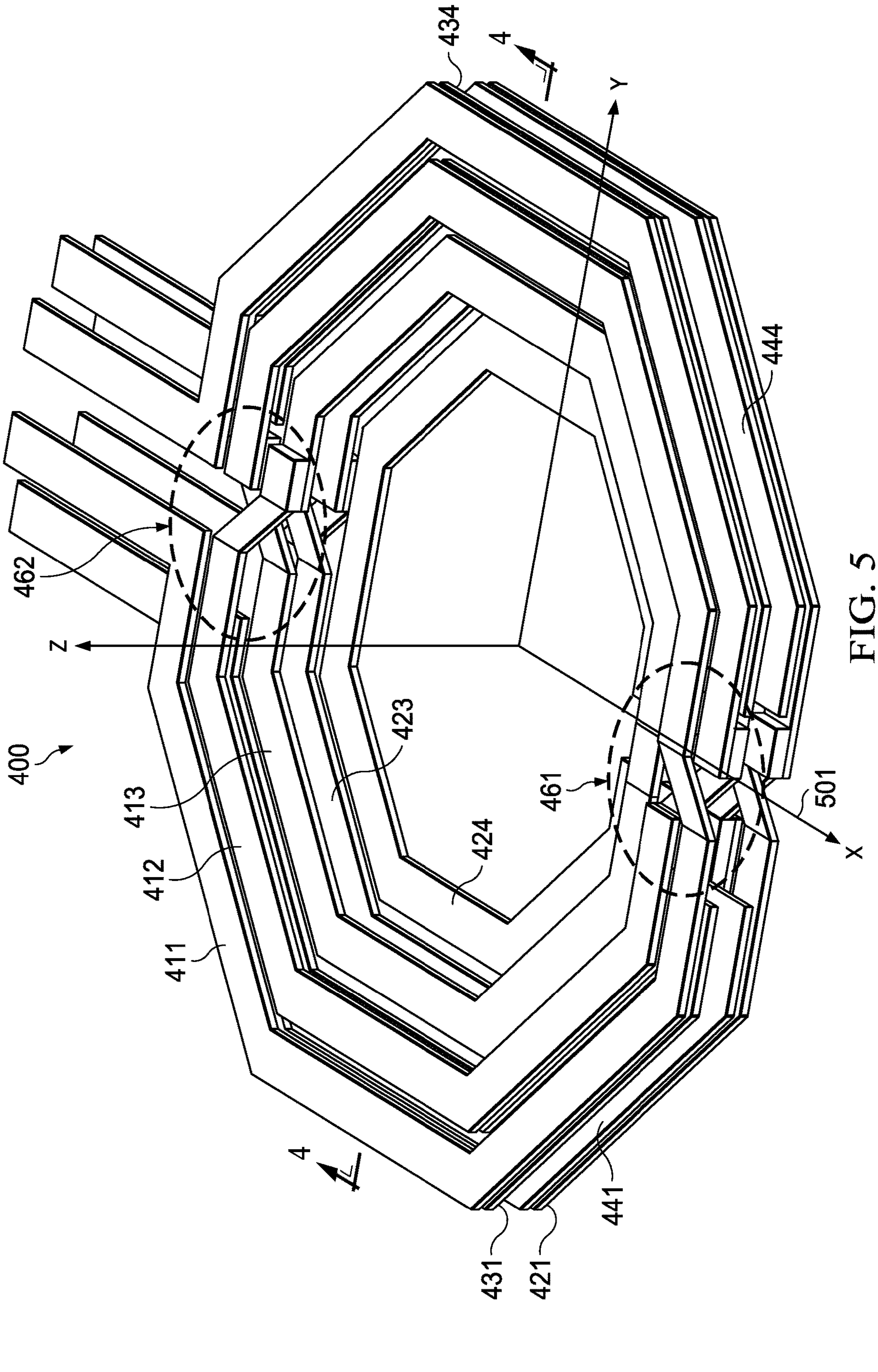
FIG. 5 is an isometric view of example coils for the transformer of FIG. 4.

FIG. 5 is an isometric view of example coils for air-core transformer 400. In this view, primary coil loops 411, 412, 413 are visible and illustrate the symmetry of the primary coil in the x-y plane. Crossover 561 utilizes vias between metal layer M1 and M2 (FIG. 4) to allow a portion of loops 411, 412 to swap places, while crossover 462 utilizes vias between metal layer M1 and M2 to allow a portion of loops 412, 413 to swap places. This allows loops 411, 412 to be fabricated on metal layer M1 and loop 413 to be fabricated on metal layer M2. In order to provide symmetry around the x-axis 501 of transformer 400, loop 413 is a middle portion of multiloop coil 401, while loop portion 411 is one end of multiloop coil 401 and loop portion 414 is an opposite end of multiloop coil 401.

The secondary coil is also symmetrical in the x-y directions and uses crossovers similar to 561, 562 to allow loops 421, 422 to be fabricated on metal layer M4 and loops 423, 424 to be fabricated on metal layer M3 in a symmetrical configuration around the x-axis 501.

Maintaining symmetry in the primary coil 401 and the secondary coil 402 minimizes noise injection across the barrier 405.

In this example, partial primary shield loop portions 431, 432, 433, 434 and partial secondary shield loop portions 441, 442, 443, 444 are approximately a half loop with a space left between adjacent half loop portions to provide a location for crossover 561, 562, etc.

In another example, the partial primary and secondary shields may be more of a solid piece of electrically conductive material. For example, loop portions 431, 432 may be expanded in width to merge together into a single half loop portion. Similarly, loop portions 433, 434 may be expanded and merged, etc. However, larger electrically conductive elements tend to incur higher loses due to eddy currents formed in the shield element. Therefore, dividing the shield into narrower, open-ended elements reduce loses from eddy currents. On the other hand, a more solid shield element will provide increased EMI protection, as long as the higher eddy current loses can be tolerated in a given design.

In this example, both the primary coil 401 and the secondary coil 402 can be active, depending on the system design in which it is being used. For that reason, an EMI shield on both the primary coil 401 and the secondary coil 402 is needed. For a design in which only one-way transmission from the primary coil will occur, then the secondary EMI shield could be eliminated.

Figure 6:
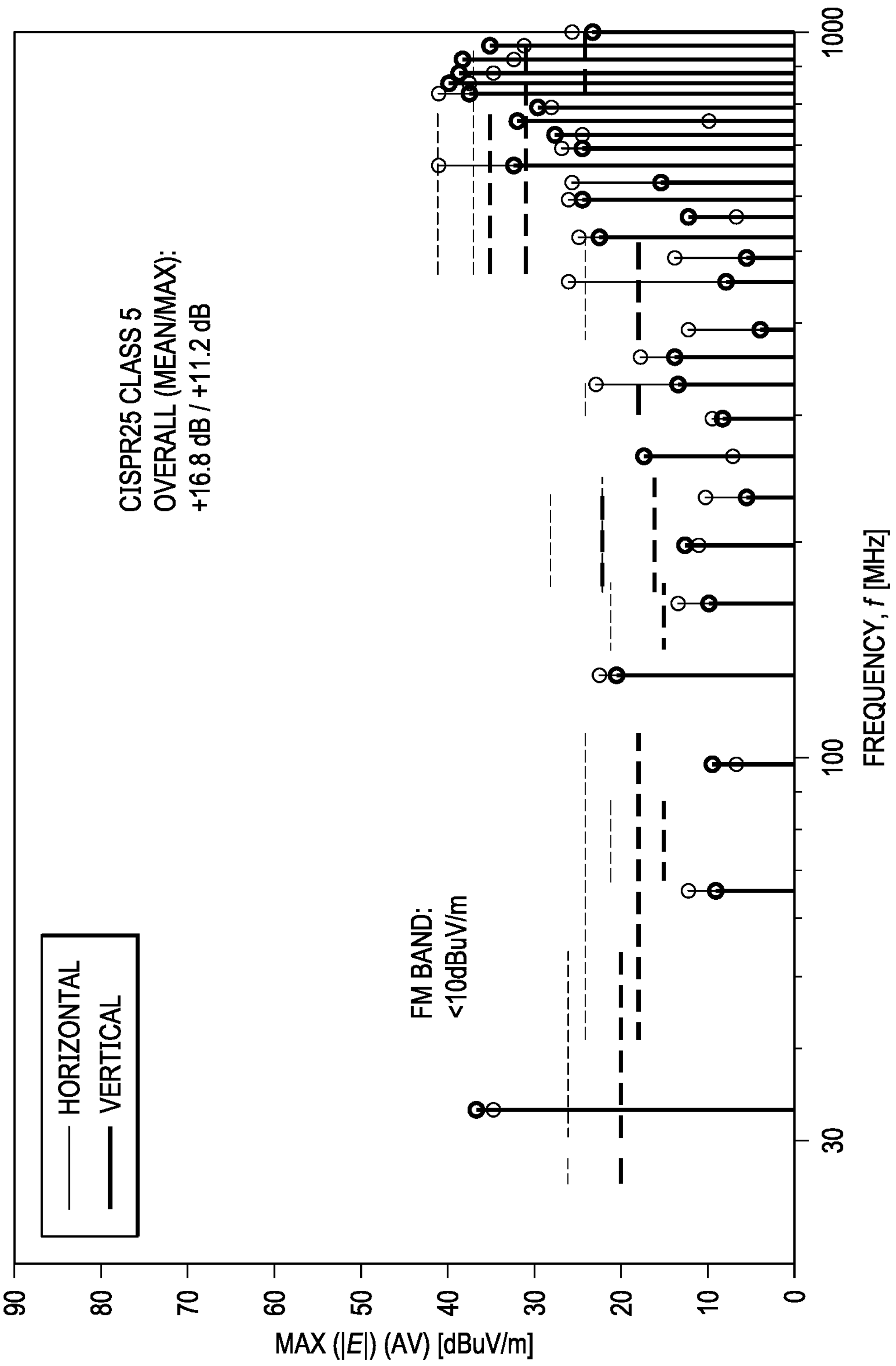
FIGS. 6-8 are plots of simulated performance of the transformer of FIG. 4.
Figure 7:
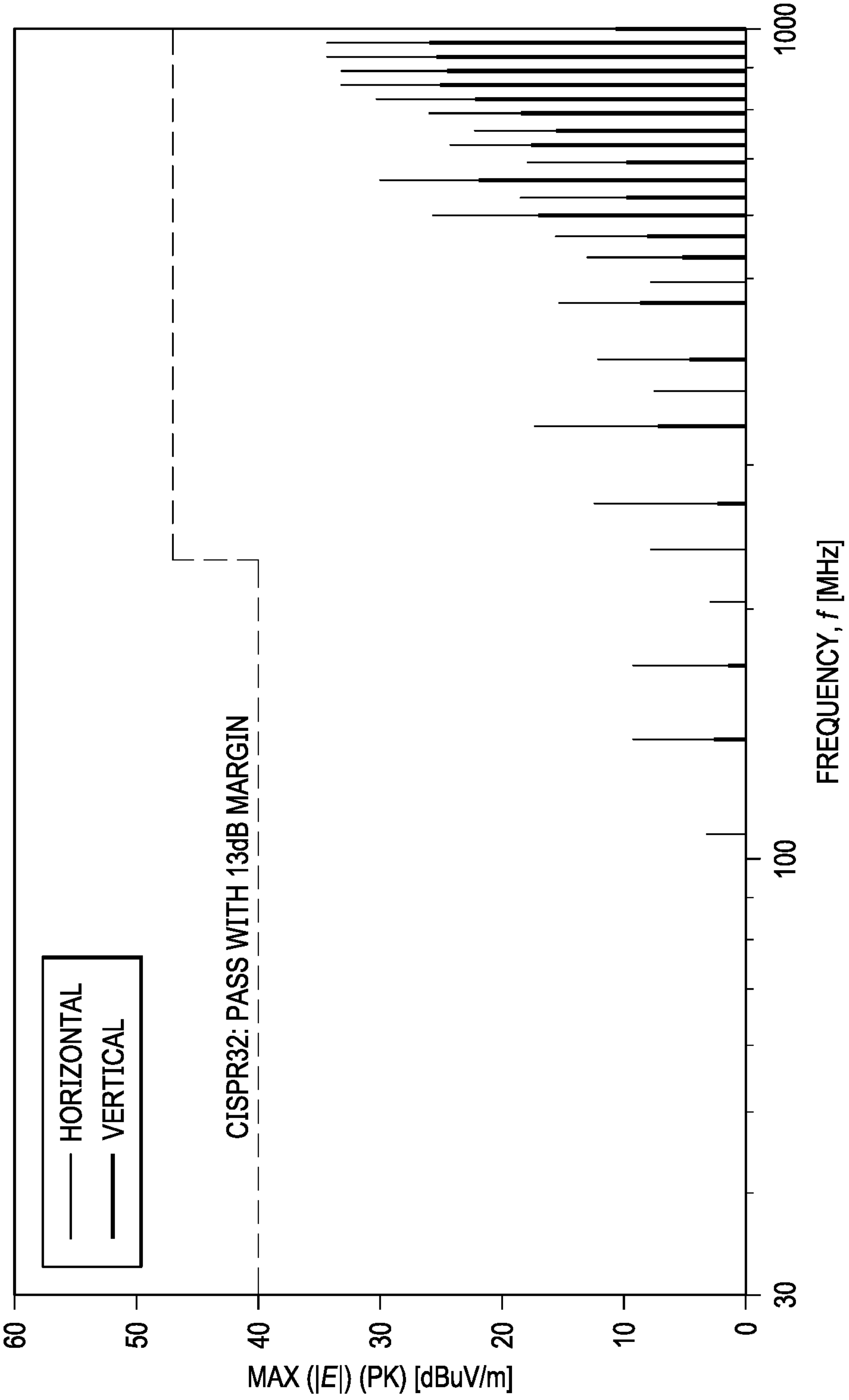

FIGS. 6 and 7 are plots of simulated EMI performance of the transformer of FIG. 4 in decibels referenced to one microvolt per meter (dB μV/m) vs frequency in megahertz (MHz). In this example simulation, Vin=5V, Vout=5V, operating frequency=33 MHz. FIG. 6 illustrates CISPR 25, class 5 limits for radiated EMI, while FIG. 7 illustrates CISPR 32 limits for radiated EMI. CISPR 32 requirement are met with 13 dB margin. For CISPR 25, the simulation indicates an expected pass of class 5 with spread-spectrum modulation (SSM), without additional PCB (printed circuit board) components, such as: ferrite beads, common-mode chokes, integrated stitching capacitor, etc. SSM is an EMI mitigation technique that changes the switching frequency within a defined frequency range (e.g. +/−5%) following a modulation pattern (e.g. triangular pattern) with a modulation frequency (e.g. fm=40 kHz). As a result, the energy is spread across the frequency range (e.g. +/−5%) reducing the magnitude. EMI improvements of 15-20 dB can be achieved.

In the example simulation represented by FIG. 6, the FM band (70-108 MHz) EMI is less than 10 dB μV/m. 16.8 dB is the max violation of the limit lines and 11.2 dB is the average violation allowed for CISPR 25 for the FM band prior to SSM.

In this example, simulation results indicate an efficiency of approximately 70%, which results in a temperature rise of approximately 30 C at a 105 C ambient, assuming a 28-pin package.

Figure 8:
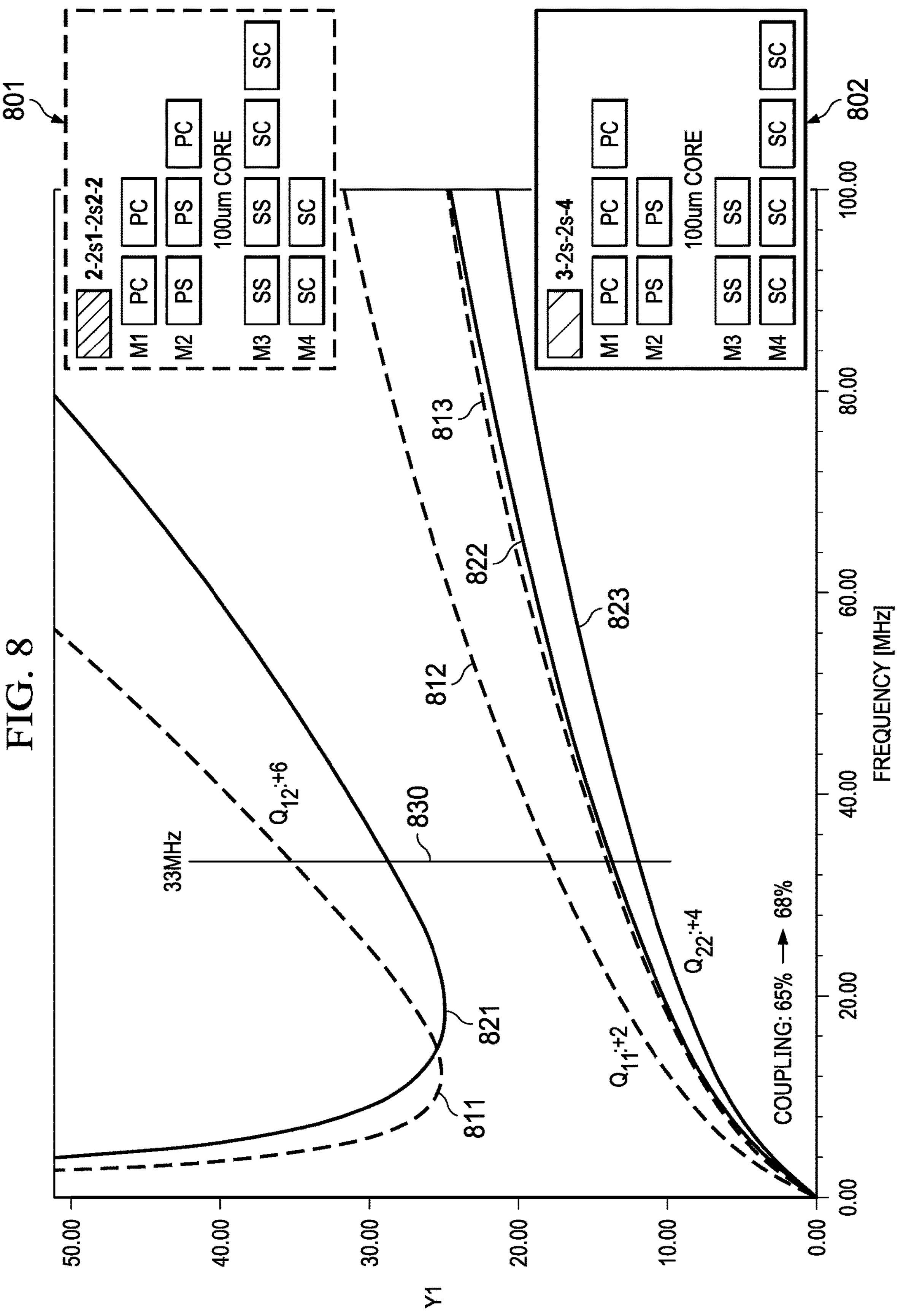

FIG. 8 includes plots illustrating quality factor (Q) two example simulated configurations 801, 802. Example configuration 801 is the same as transformer 400 (FIG. 4) in which two primary coil loops are on metal layer M1, two primary shield portions and one primary coil loop are on metal layer M2, two secondary shield portions and two secondary coil loops are on metal layer M3, and two secondary coil loops are on metal layer M4. Example configuration 802 has three primary coil loops on metal layer M1, two primary shield portions on metal layer M2, two secondary shield portions on metal layer M3, and four secondary coil loops on metal layer M4. In each configuration, a 100 μm barrier distance is maintained between primary and secondary.

Plot lines 811, 812, and 813 represent mutual quality factor Q12, primary quality factor Q11, and secondary quality factor Q22 respectively for configuration 801. Plot lines 821, 822, 823 represent Q12, Q11, and Q22 respectively for configuration 802. Frequency line 830 indicates operation at 33 MHz. As indicated by line 830, the Q12 for configuration 801 is approximately 35 and for configuration 802 is approximately 29, for an improvement of approximately six. Similarly, Q11 is improved by two and Q22 is improved by four for configuration 801 compared to configuration 802. This results in an improvement in efficiency from approximately 65% for configuration 802 to approximately 69% for configuration 801.

Figure 9A:
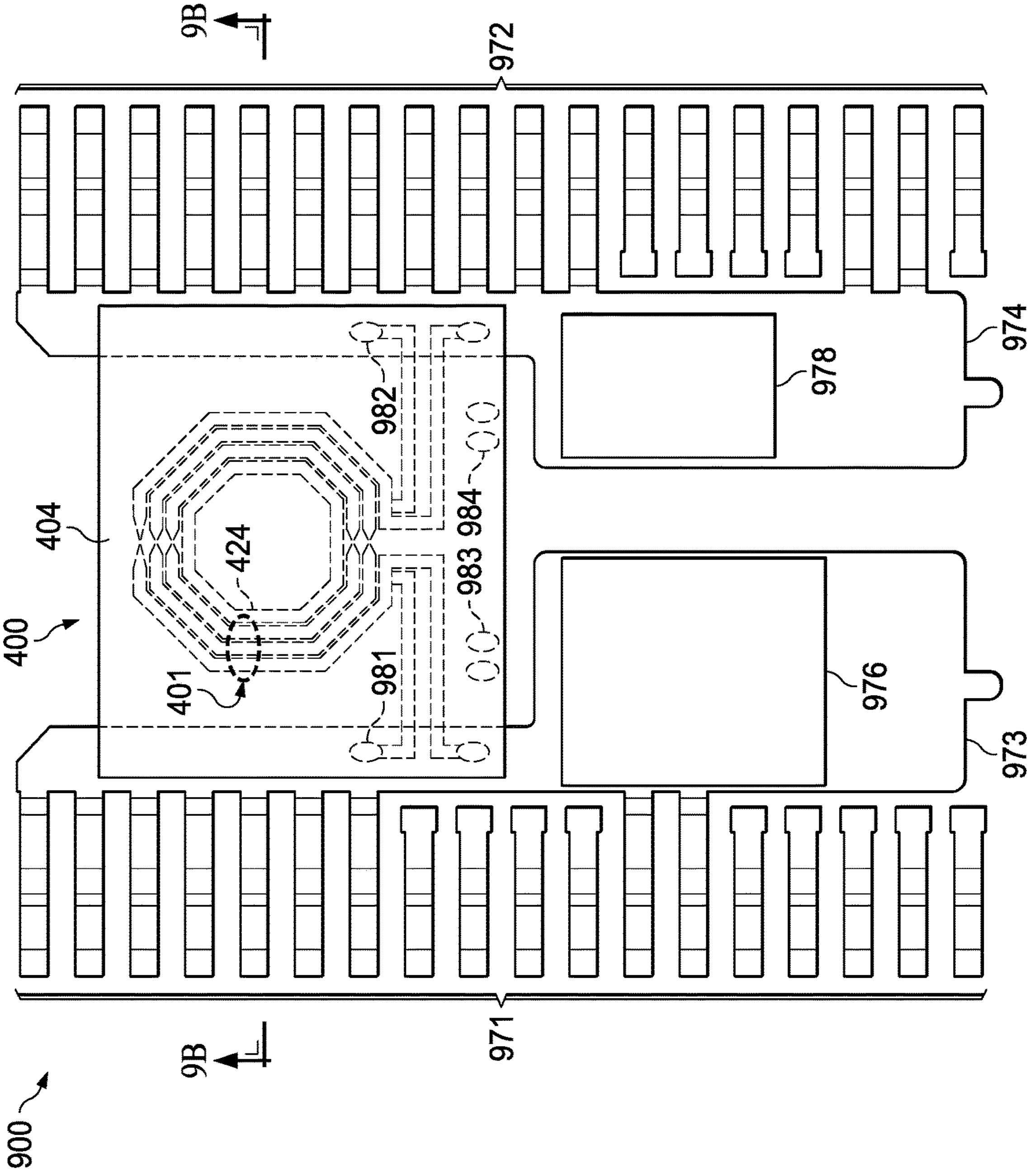
FIG. 9A is a top view and FIG. 9B is a cross sectional view of an example packaged air-core transformer.
Figure 9B:
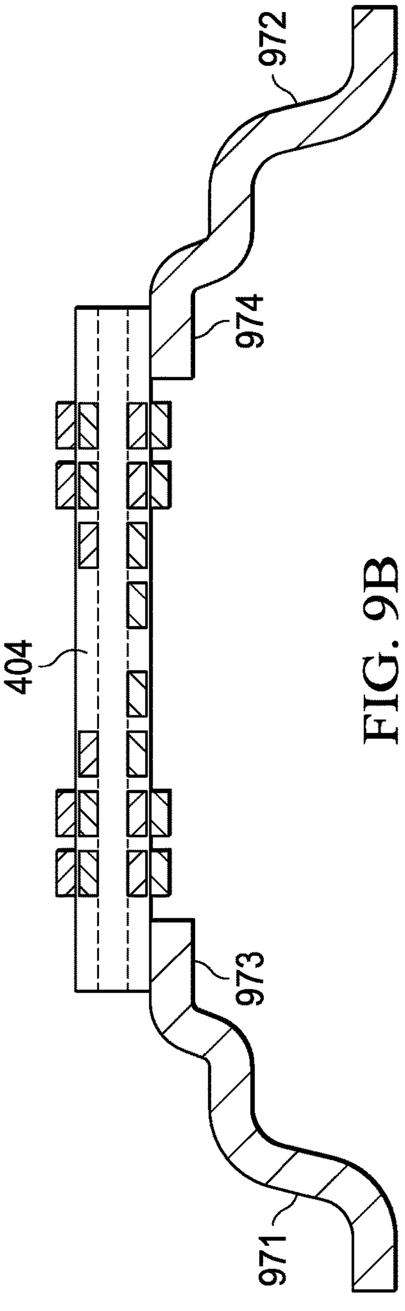

FIG. 9A is a top view and FIG. 9B is a cross-sectional view of an example isolation device 900 that includes a laminate transformer 400 (FIGS. 4, 5). In this example, laminate transformer 400 includes a multilayer laminate substrate 404 that has a top surface and an opposite bottom surface. Primary coil 401 and secondary coil 402 (FIG. 4) along with partial primary and secondary shields are each located on layers of multilayer substrate 404. Primary terminals 981, secondary terminals 982, partial primary shield terminals 983, and partial secondary terminals 984 are coupled to their respective coil structures.

A lead frame is attached to transformer 400, typically using an adhesive material. In this example, left lead frame 971 has a portion 173 that overlaps and is adhered to substrate 404. Similarly, right lead frame 972 has a portion 974 that overlaps and is adhered to substrate 404.

In this example, driver circuitry IC die 976 is attached to a die attach pad on left lead frame 971 and rectifier circuitry IC die 972 is attached to a die attach pad on right lead frame 972. In this example, a wire bonding technique is used to interconnect transformer terminals 981, 982, 983, 984 with bond pads on IC die 972, 973 and leads on lead frame 971, 972.

Figure 10:
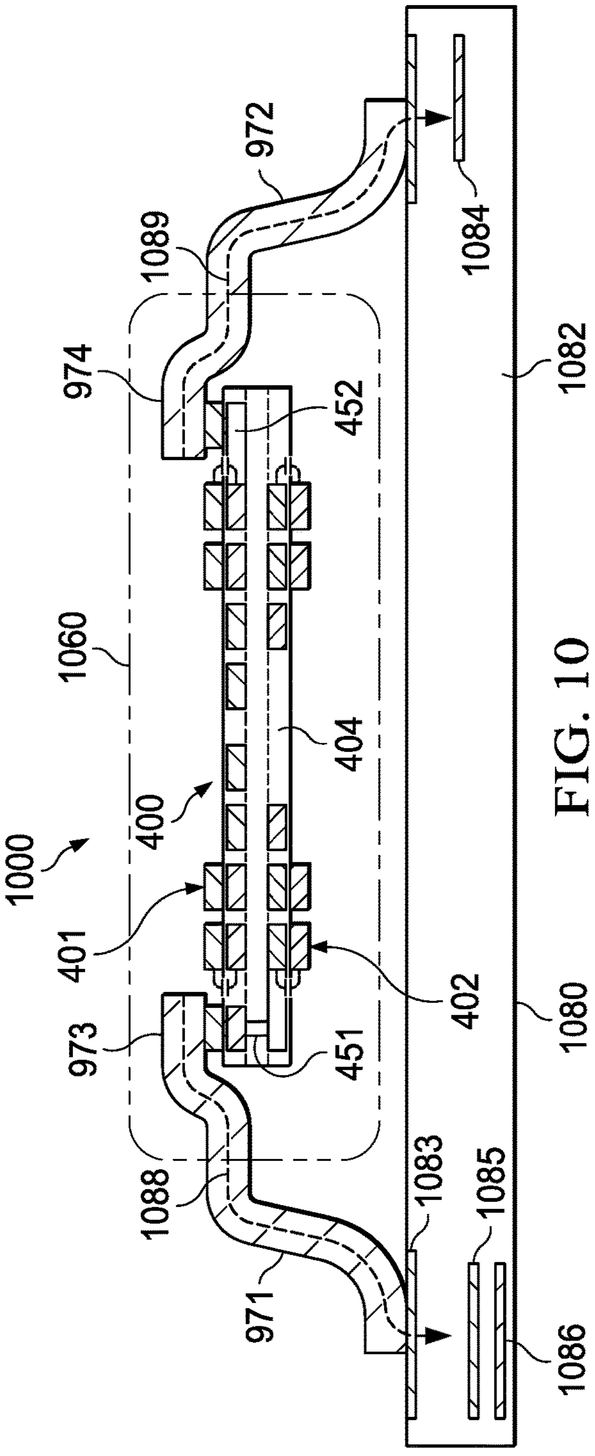
FIG. 10 is a cross-sectional view of an example laminate transformer package mounted on a PCB.

FIG. 10 is a cross-sectional view of the isolation device 1000 that includes symmetric air-core transformer 400, illustrating thermal conductivity within device 1000. Isolation device 1000 is encapsulated in a mold compound 1060 using a known integrated packaging technique. In this example, isolation device 1000 is mounted on a printed circuit board (PCB) 1080 on which additional components and/or integrated circuits are mounted (not shown). PCB 1080 includes metallic pads 1083, 1084 onto which the leads of lead frame 971/972 are soldered using known soldering techniques. Various metallic signal lines and power planes 1084, 1085, 1086, etc. within PCB 1080 act as heat sinks for isolation device 1000.

Heat is generated within coils 401, 402 due to resistive heating caused by the ohmic resistance (R) of the coils and the amount of current (I) being conducted by the coils. This is often referred to as "$I^2R$ heating". Heat generated within the coils must be dissipated to keep the isolation device from overheating. Some heat is dissipated by infrared radiation away from device 1000. Some heat may be dissipated by convection of the surrounding air around isolation device 1000. However, most of the heat is dissipated by conduction from coils 401, 402 of transformer 400 through substrate 404 and then through lead frames 971, 972 to PCB 1080, as illustrated by thermal conduction paths 1088, 1089. In this example, thermal conduction path 1088 includes traveling through thermal path 451 (FIG. 4). Likewise, thermal conduction path 1098 includes traveling through thermal path 452 (FIG. 4). Thermal conduction paths 1088, 1089 have a higher thermal conductivity than the material of multilayer substrate 404 and thereby heat dissipation is improved.

Figure 11:
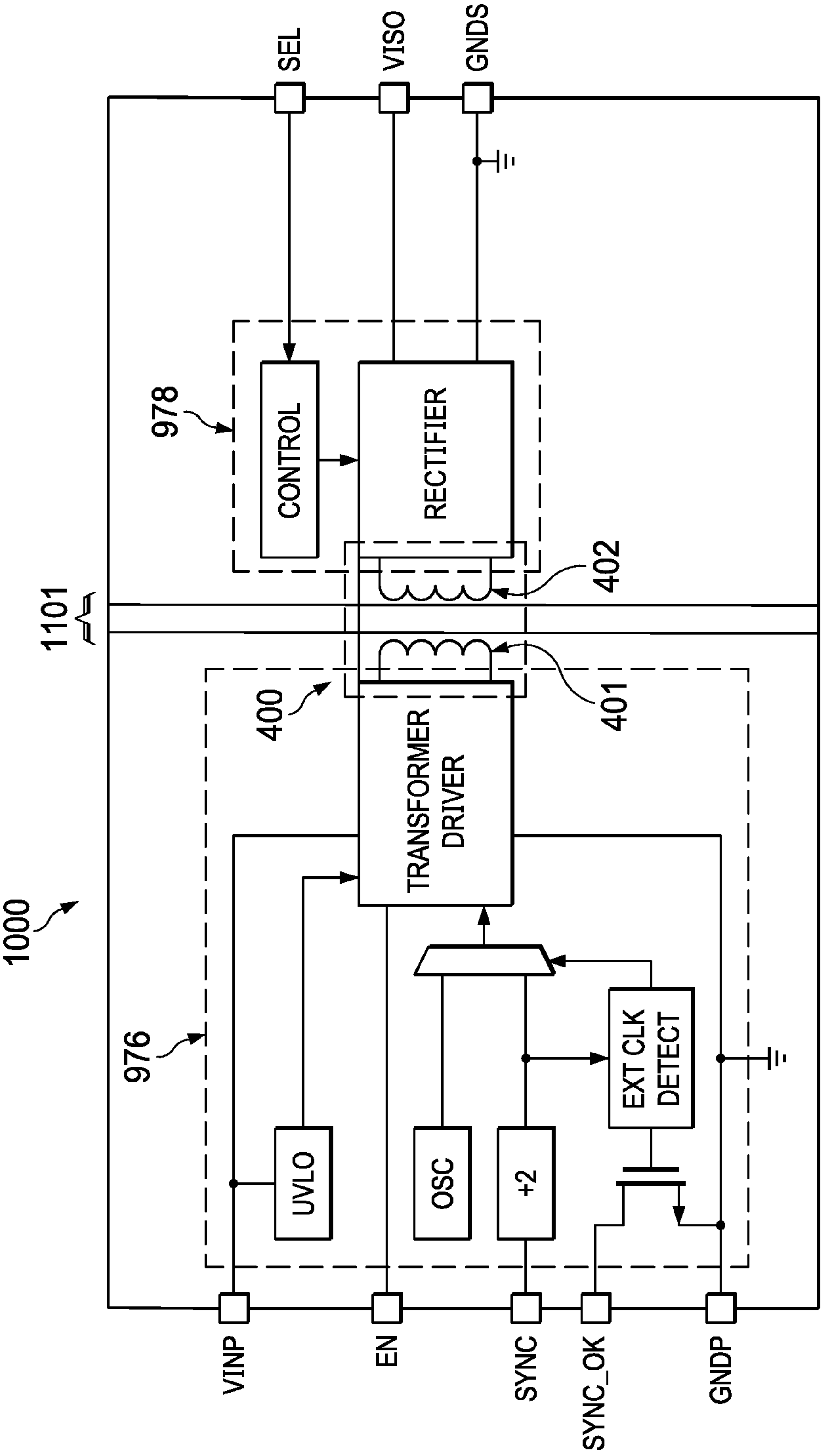
FIG. 11 is a block diagram of an example isolation device that includes a transformer with partial EMI shielding.

FIG. 11 is a block diagram of example isolation device 1000 (FIG. 10) that includes a laminate transformer 400 in which partial primary and secondary shields are provided to reduce EMI conduction through transformer 400. Boundary region 1101 illustrates a galvanic isolation boundary that is provided by isolation device 1000 using laminate transformer 400.

Circuitry 976 includes inverter switching circuitry and driver circuitry configured to invert a direct current (DC) voltage applied to terminal Vinp in a periodic manner so that a resultant oscillating voltage applied to primary coil 401 will induce a voltage in secondary coil 402. Circuitry 978 rectifies and filters the induced voltage to provide a DC output signal on output terminal Viso. In this manner, a DC input signal is transferred across a galvanic isolation barrier to form an output DC signal. In this example, the isolation barrier is rated to provide an isolation voltage protection of 5 kv. In other example, the isolation barrier may be rated at 3 kv. In other examples, the isolation rating may be higher or lower than this, depending on the design of the isolation transformer.

Circuitry 978 is mounted on a die attach pad on a lead frame and is coupled to secondary coil 402 as described in more detail herein above. Circuitry 976 is mounted on a separate lead frame and is coupled to primary coil 401. Circuitry 976 together with primary coil 401 reside in a primary voltage domain. Circuitry 978 together with secondary coil 402 reside in a secondary voltage domain.

Laminate transformer 711, circuitry 731, 732 and the associated lead frames are all encapsulated together with a mold compound using a known or a later developed molding technique to form a packaged isolation device.

OTHER EMBODIMENTS

In described examples, a single isolation device is illustrated on a PCB, such as PCB 1080, (FIG. 10). In other examples, several isolation devices may be mounted on a single PCB to provide galvanic isolation to several signals that must communicate across an isolation barrier.

In described examples, the coils are illustrated as being octagonal. In another example, the coils may have a different symmetrical shape, such a circular, hexagonal, square, rectangular, etc.

In described examples, the transformer coils are formed for copper layers having a thickness of 12 um-30 um. In other examples, thinner copper may be used, depending on expected current flow. In other examples, thicker copper may be used to support higher current flow.

In described example, a three-loop primary coil and a four-loop secondary coil are illustrated. In another example, additional, or fewer, loops may be used for the primary and/or the secondary coil. In another example, the primary coil and the secondary coil may have the same number of loops.

In described examples, the lead frames are made from copper. In another example, the lead frames may be fabricated from another electrically conductive material, such as aluminum, etc.

In described examples, the coils and shields are made from copper. In another example, the coil and shields may be fabricated from another electrically conductive material, such as aluminum, etc.

In described examples, layers of the laminate substrate are laminate materials that include bismaleimide triazine (BT) and that have a high breakdown strength of 100-120V/um. Such material may be obtained from Mitsubishi Gas Chemical (MGC) as copper clad laminates and pre-pregs, for example. However, in other examples, different types of laminate material may be used, such as ABF (Ajinomoto Buildup Films) material.

In described examples, the separate circuit ICs are coupled to the lead frame leads using a wire bonding technique. In another example, other types of known or later developed techniques may be used to couple the ICs to the lead frame and/or transformer coils.

In described examples, separate left and right lead frame elements are illustrated. However, during fabrication, a large sheet or strip of lead frames is fabricated using etching, stamping or other known or later developed techniques. Multiple laminate transformers are then positioned on the lead frame sheet/strip using a pick and place machine and attached with laminate attach adhesive. The circuit IC die are also positioned ono the lead frame sheet/strip using a pick and place machine and attached with die attach adhesive. After a wire bonding process, the entire lead frame sheet/strip is then molded to form multiple isolation devices. The lead frame sheet/strip is then cut apart to separate the isolation devices.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

What is claimed is:

1. An apparatus comprising:

a substrate having a vertical stack of at least first, second, third, and fourth metal layers, the substrate including:

a first coil having at least a first loop in the first metal layer and at least a second loop in the second metal layer;

a second coil having at least a third loop on the third metal layer and at least a fourth loop in the fourth metal layer;

a first shield layer in the second metal layer; and a second shield layer in the third metal layer.

2. The apparatus of claim 1, wherein the second and third metal layers are between the first and fourth metal layers.

3. The apparatus of claim 1, wherein the first and second shield layers are between the first and fourth loops.

4. The apparatus of claim 1, wherein the first coil and the second coil are each symmetrical around an axis.

5. The apparatus of claim 1, wherein the substrate includes:

a pad on a surface of the substrate; and a conductive structure coupled between the pad and the first shield layer.

6. The apparatus of claim 5, wherein the pad is a first pad, the conductive structure is a first conductive structure, and the substrate includes:

a second pad on the surface; and a second conductive structure coupled between the second pad and the second shield layer.

7. The apparatus of claim 5, wherein the first and second conductive structures include vias coupled to the second, third, and fourth metal layers.

8. The apparatus of claim 1, wherein the substrate includes copper clad laminates and pre-pregs.

9. The apparatus of claim 8, wherein each pre-preg has a thickness of 30-70 micrometers (um).

10. The apparatus of claim 8, wherein each metal layer has a thickness of 12-30 um.

11. The apparatus of claim 1, wherein the first coil and the second coil are primary and secondary coils of a transformer.

12. The apparatus of claim 1, wherein the first coil is coupled to first terminals, the second coil is coupled to second terminals, the first shield layer is coupled to a third terminal, and the second shield layer is coupled to a fourth terminal.

13. The apparatus of claim 12, wherein the third terminal is a first reference terminal, and the fourth terminal is a second reference terminal.

14. The apparatus of claim 1, wherein a vertical spacing between the second metal layer and the third metal layer is based on a target breakdown voltage.

15. The apparatus of claim 1, wherein the first shield layer includes a a third coil and the second shield layer includes a fourth coil.

16. The apparatus of claim 15, wherein the third coil includes at least a fifth loop, the fourth coil includes at least a sixth loop, and the fifth and sixth loops align with, respectively, the first loop and the fourth loop.

17. The apparatus of claim 1, wherein the first coil includes a fifth loop in the first metal layer, the first loop includes a first segment and a second segment, the fifth loop includes a third segment and a fourth segment, and the substrate includes:

a fifth segment in the first metal layer coupled between an end of the first segment and a first end of the third segment;

a first via coupled between a second end of the third segment and a first end of the second loop;

a second via coupled to a second end of the second loop, a sixth segment in the first metal layer coupled between the second via and a first end of the fourth segment, a seventh segment in the second metal layer coupled to a second end of the fourth segment; and a third via coupled between the seventh segment and an end of the second segment.

* * * * *